United States Patent
Edwards et al.

(10) Patent No.: US 9,224,191 B2
(45) Date of Patent: Dec. 29, 2015

(54) MASKING TOOL

(71) Applicants: Sony Corporation, Tokyo (JP); Sony Electronics, Inc., Park Ridge, NJ (US)

(72) Inventors: Eric Edwards, Captain Cook, HI (US); Clay Harvey Fisher, San Diego, CA (US); Kurt Jonach, San Jose, CA (US); Neal Jacob Manowitz, Montebello, NY (US); John Tree, London (GB)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 87 days.

(21) Appl. No.: 14/183,368

(22) Filed: Feb. 18, 2014

(65) Prior Publication Data

US 2014/0160306 A1 Jun. 12, 2014

Related U.S. Application Data

(63) Continuation of application No. 13/557,167, filed on Jul. 24, 2012, now Pat. No. 8,750,644, which is a continuation of application No. 13/101,063, filed on May 4, 2011, now Pat. No. 8,254,722, which is a continuation of application No. 12/547,393, filed on Aug. 25, 2009, now Pat. No. 7,961,978, which is a continuation of application No. 11/948,889, filed on Nov. 30, 2007, now Pat. No. 7,587,100, which is a continuation of application No. 11/273,055, filed on Nov. 14, 2005, now Pat. No. 7,391,929, which is a continuation-in-part of application No. 09/782,235, filed on Feb. 12, 2001, now Pat. No. 7,027,663.

(60) Provisional application No. 60/181,778, filed on Feb. 11, 2000.

(51) Int. Cl.
*G06K 9/20* (2006.01)
*G06T 5/00* (2006.01)
*G06F 3/0484* (2013.01)
*G06T 11/00* (2006.01)
*H04N 1/00* (2006.01)
*H04N 1/387* (2006.01)
*H04N 5/232* (2006.01)
*G06T 3/40* (2006.01)
*H04N 101/00* (2006.01)

(52) U.S. Cl.
CPC .............. *G06T 5/00* (2013.01); *G06F 3/04845* (2013.01); *G06T 3/4092* (2013.01); *G06T 11/00* (2013.01); *H04N 1/0044* (2013.01); *H04N 1/00244* (2013.01); *H04N 1/00392* (2013.01); *H04N 1/00424* (2013.01); *H04N 1/3872* (2013.01); *H04N 5/23222* (2013.01); *H04N 5/23235* (2013.01); *H04N 5/23293* (2013.01); *H04N 2101/00* (2013.01); *H04N 2201/001* (2013.01); *H04N 2201/0084* (2013.01)

(58) Field of Classification Search
USPC .......... 382/212, 213, 282, 283; 358/517, 537, 358/538
See application file for complete search history.

(56) References Cited

U.S. PATENT DOCUMENTS 5,247,583 A 9/1993 Kato et al.
5,283,560 A 2/1994 Bartlett
(Continued)

FOREIGN PATENT DOCUMENTS

EP 0853426 A2 7/1998
EP 1496687 A1 1/2005
(Continued)

*Primary Examiner* — Yosef Kassa
(74) *Attorney, Agent, or Firm* — Haverstock & Owens LLP

(57) ABSTRACT

A system for controlling effects performed on an image includes a digital camera having a display that displays the image. Masking tools position graphical representations on the display to define a portion of the image that is altered when the effects are subsequently applied to the image. The several masking tools may be combined to form a single masking tool.

11 Claims, 7 Drawing Sheets

(56) References Cited

U.S. PATENT DOCUMENTS

| | | | |
|---|---|---|---|
| 5,459,586 A | 10/1995 | Nagasato et al. |
| 5,533,185 A | 7/1996 | Lentz et al. |
| 5,594,850 A | 1/1997 | Noyama et al. |
| 5,617,114 A | 4/1997 | Bier et al. |
| 5,649,259 A | 7/1997 | Hylen |
| 5,651,107 A | 7/1997 | Frank et al. |
| 5,734,425 A | 3/1998 | Takizawa et al. |
| 5,754,227 A | 5/1998 | Fukuoka |
| 5,767,843 A | 6/1998 | Wagner et al. |
| 5,940,641 A | 8/1999 | Mcintyre et al. |
| 6,072,962 A | 6/2000 | Parulski |
| 6,074,111 A | 6/2000 | Kasahara |
| 6,097,901 A | 8/2000 | Parulski |
| 6,111,605 A | 8/2000 | Suzuki |
| 6,118,427 A | 9/2000 | Buxton et al. |
| 6,208,379 B1 | 3/2001 | Oya et al. |
| 6,285,834 B1 | 9/2001 | Hylen |
| 6,300,955 B1 | 10/2001 | Zamir |
| 6,380,975 B1 | 4/2002 | Suzuki |
| 6,400,908 B1 | 6/2002 | Parulski |
| 6,429,881 B1 | 8/2002 | Olsen, IV |
| 6,441,854 B2 | 8/2002 | Fellegara et al. |
| 6,445,816 B1 | 9/2002 | Pettigrew |
| 6,462,868 B1 | 10/2002 | Giesberg et al. |
| 6,477,266 B1 | 11/2002 | Asar |
| 6,485,869 B2 | 11/2002 | Tsai et al. |
| 6,529,208 B1 | 3/2003 | Chun et al. |
| 6,552,830 B2 | 4/2003 | Long |
| 6,707,487 B1 | 3/2004 | Aman et al. |
| 6,718,353 B2 | 4/2004 | Hara et al. |
| 6,757,645 B2 | 6/2004 | Chang et al. |
| 6,760,665 B1 * | 7/2004 | Francis | G01V 1/40 702/16 |
| 6,766,042 B2 | 7/2004 | Freeman et al. |
| 6,804,779 B1 | 10/2004 | Carroni et al. |
| 6,864,916 B1 | 3/2005 | Nayer et al. |
| 6,885,492 B2 | 4/2005 | DeSimone et al. |
| 6,919,892 B1 | 7/2005 | Cheiky et al. |
| 6,950,198 B1 | 9/2005 | Beraducci et al. |
| 6,954,549 B2 | 10/2005 | Kraft |
| 6,958,772 B1 | 10/2005 | Sugimori |
| 6,963,363 B1 | 11/2005 | Ohmura |
| 7,006,630 B2 | 2/2006 | Yu et al. |
| 7,027,054 B1 | 4/2006 | Cheiky et al. |
| 7,027,663 B2 | 4/2006 | Edwards |
| 7,043,019 B2 | 5/2006 | Tehranchi et al. |
| 7,127,614 B2 | 10/2006 | Kawaguchi et al. |
| 7,130,474 B2 | 10/2006 | Luo et al. |
| 7,181,081 B2 | 2/2007 | Sandrew |
| 7,308,139 B2 * | 12/2007 | Wentland | G01V 1/34 382/109 |
| 7,308,158 B2 | 12/2007 | Herbert et al. |
| 7,333,670 B2 | 2/2008 | Sandrew |
| 7,448,063 B2 | 11/2008 | Freeman et al. |
| 7,573,514 B2 | 8/2009 | Pasquarette et al. |
| 7,574,514 B2 | 8/2009 | Deshpande |
| 7,577,313 B1 | 8/2009 | Georgiev |
| 8,041,140 B1 | 10/2011 | Georgiev |
| 8,056,559 B2 | 11/2011 | O'Connor et al. |
| 8,107,599 B2 * | 1/2012 | Topiwala | G06Q 10/107 379/88.17 |
| 8,139,083 B2 | 3/2012 | de Leon |
| 8,170,095 B2 * | 5/2012 | Roman | H04N 19/115 375/240 |
| 8,175,409 B1 | 5/2012 | Wilensky |
| 8,225,208 B2 | 7/2012 | Sprang et al. |
| 8,280,179 B2 | 10/2012 | Lin |
| 8,306,272 B2 * | 11/2012 | Reinpoldt, III | G06K 9/00771 205/203 |
| 8,319,031 B2 | 11/2012 | Narvel et al. |
| 8,359,642 B1 * | 1/2013 | Wurtenberger | H04L 63/0227 709/206 |
| 8,559,732 B2 | 10/2013 | Rayner |
| 2002/0038323 A1 | 3/2002 | Hara et al. |
| 2002/0093514 A1 | 7/2002 | Edwards et al. |
| 2005/0263026 A1 | 12/2005 | Aosaki et al. |

FOREIGN PATENT DOCUMENTS

| | | |
|---|---|---|
| JP | 11098286 A | 4/1999 |
| JP | 11196362 A | 7/1999 |
| WO | 2007005834 A2 | 1/2007 |

\* cited by examiner dd
MASKING TOOL

CROSS REFERENCES RELATED TO THE APPLICATION

This application is a continuation application of co-pending U.S. patent application Ser. No. 13/557,167, filed on Jul. 24, 2012, and titled "MASKING TOOL" which is a continuation application of co-pending U.S. patent application Ser. No. 13/101,063, filed on May 4, 2011, and titled "MASKING TOOL" which is a continuation of U.S. patent application Ser. No. 12/547,393 filed Aug. 25, 2009, now U.S. Pat. No. 7,961,978, which is a continuation of U.S. patent application Ser. No. 11/948,889 filed Nov. 30, 2007, now U.S. Pat. No. 7,587,100, which is a continuation of U.S. patent application Ser. No. 11/273,055 filed Nov. 14, 2005, now U.S. Pat. No. 7,391,929, which is a continuation in part of U.S. patent application Ser. No. 09/782,235 filed Feb. 12, 2001, now U.S. Pat. No. 7,027,663, which claims the benefit of U.S. Provisional Application No. 60/181,778 filed Feb. 11, 2000, all of which are hereby incorporated by reference in their entireties.

FIELD OF THE INVENTION

This invention relates generally to graphical editing technologies, and more particularly, to controlling applications of effects by using masking tools.

BACKGROUND OF THE INVENTION

With the increasing popularity of computing and the use of the Internet in many fields, the ability to control computers and similar devices in a simple, convenient manner has become extremely important. However, existing interfaces to computers and similar devices can be cumbersome and complicated.

In particular, many users of graphical editing programs would benefit from an improved interface used to control the application of various special effects onto an image. For example, graphical editing programs would benefit from improved control of the application of the effects with respect to the intensity and the area of the image that is being subjected to modification by application of the effect Some software applications implement mask tools that are similar to applying a cut out or stencil to protecting area of the underlying image. They also implement control that applies effects only to a localized area, similar to a street paint tool.

BRIEF DESCRIPTION OF THE DRAWINGS

The embodiments of the invention may best be understood by referring to the following description and accompanying drawings that are used to illustrate these embodiments.

DETAILED DESCRIPTION

In the following detailed description of the embodiments of the invention, references are made to the accompanying drawings in which like references indicate similar elements, in which, is shown by way of illustration of specific embodiments in which the invention may be practiced. These embodiments are described in sufficient detail to enable those skilled in the art to practice the invention and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

A. General System Architecture

Figure 1A:
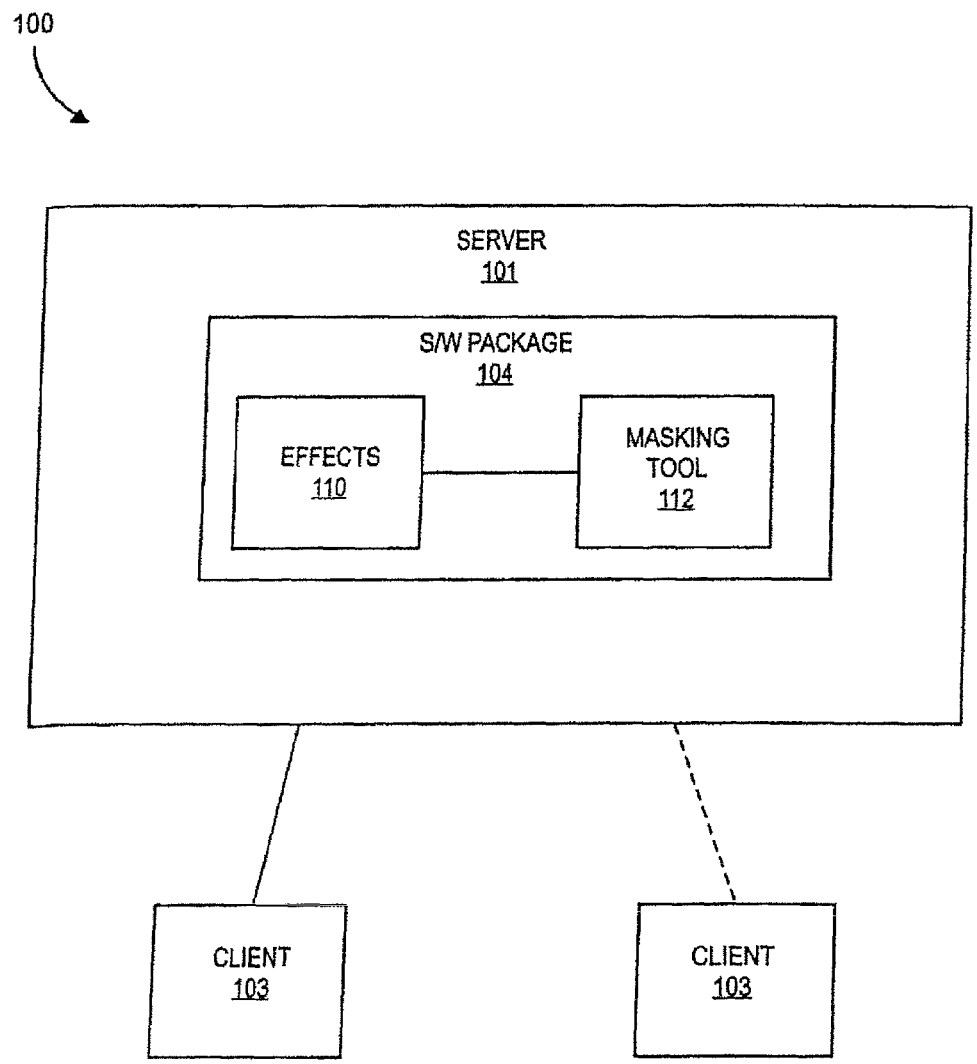
FIG. 1A illustrates an exemplary system implemented with an embodiment of the invention.

Beginning with an overview of the operation of the invention, FIG. 1A illustrates a system 100 which can control the effects of image manipulation according to one embodiment of the present invention. System 100 includes server 101 and one or more clients 103. Stored in memory resident within server 101, a typical software application 104 is an image-editing package adapted to manipulate images provided by client 103. The operations of software application 104 may be controlled by server 101 or through control information from client 103. Within the software application 104, an effects block 110 and a masking tool block 112 reside. These "blocks" denote a collection of one or more instructions, including but not limited to a routine, function, or any other process. The effects block 110 applies a specific effect to the image and the masking tool block 112 selectively limits the area of the image which is modified by the effects block 110.

Figure 1B:
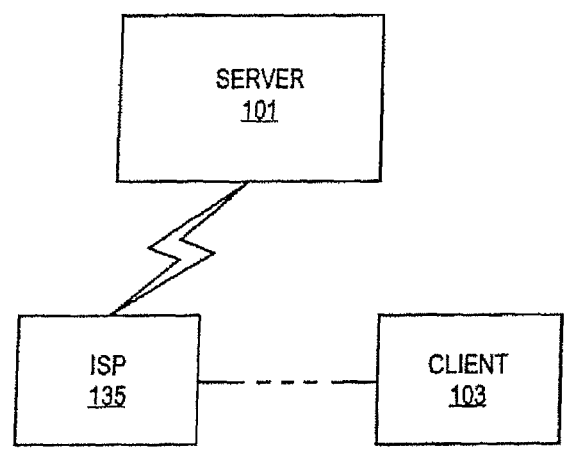
FIG. 1B illustrates a network overview of the present invention.

As shown in FIG. 1B, client 103 may establish communications with server 101 through a wide area network. For instance, client 103 may communicate directly with an Internet Service Provider (ISP) that communicates with server 101.

A client 103 represents any device that may enable user's online access to information. Illustrative examples of a "client" may include, but are not limited or restricted to a digital camera, a stand-alone device to view images inclusive of a kiosk, a hand-held image viewing device (e.g., portable computer, personal digital assistant, iPOD® or other music/video/image viewing device, etc.), a camera cellular phone, and the like. In this embodiment, client 103 may provide a user interface to communicate information to the user. It should be noted that although FIG. 1A illustrates only two modules performing the above functionality, more or less modules may be used to perform this functionality.

Figure 1C:
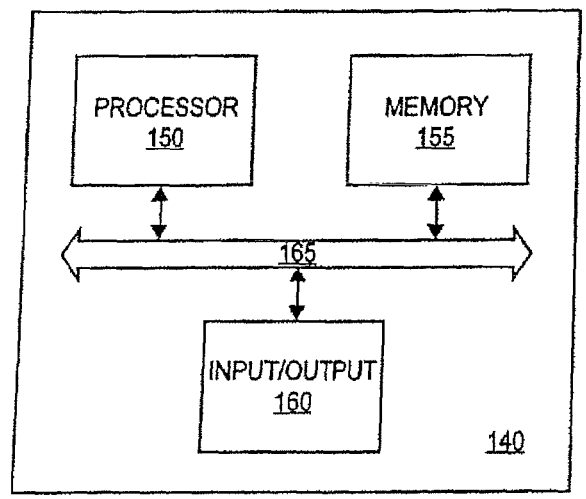
FIG. 1C illustrates a basic processor of the present invention.

One exemplary embodiment of client 103 is a digital camera 140 that is illustrated in FIG. 1C. For this embodiment, digital camera 140 includes a processor 150, a memory 155 and an input/output device 160 coupled to a bus 165. Input/output device 160 includes an interface to establish a wired or wireless communication path with server 101. Memory 155 is configured to store images that are captured by digital camera 140 and processed by processor 150.

Memory 155 encompasses various types of computer readable media, including any type of storage device that is accessible by processor 150. One of the skilled the art will immediately recognize that the term "computer readable media"

encompasses any suitable storage medium such as a programmable electronic circuit, any type of semiconductor memory device such as a volatile memory (e.g., random access memory, etc.) or non-volatile memory (e.g., read-only memory, flash memory, etc.), a hard drive disk, or any portable storage such as a floppy diskette, an optical disk (e.g., compact disk or digital versatile disc "DVD"), memory stick, a digital tape or the like.

Of course, it is appreciated that digital camera 140 may be controlled by operating system software including instructions executed by processor and stored in internal memory. Also, software application 104 may be implemented within memory 155 or another memory component that is integrated within processor 150 or external to processor 150 in lieu of or in addition to such storage within server 101. Thus, the digital camera 140 may perform masking operations and applying effects to the image directly.

As a first illustrative example, software application 104 may be loaded into server 101 to perform the masking and application of effects on an image as described below. These masking operations are controlled by the digital camera 140. According to a second illustrative example, the software application 104 may be loaded within digital camera 140 to perform the masking and application of effects on an image, but the masking tool is fetched by digital camera 140 from memory implemented within server 101. According to a third illustrative embodiment, a high-resolution image targeted for manipulation is loaded on server 101 while a low-resolution image loaded in digital camera 140. In response to selected operations on the low-resolution image, corresponding operations are performed on the high-resolution image.

B. Embodiments of the Masking Tool

Figure 2A:
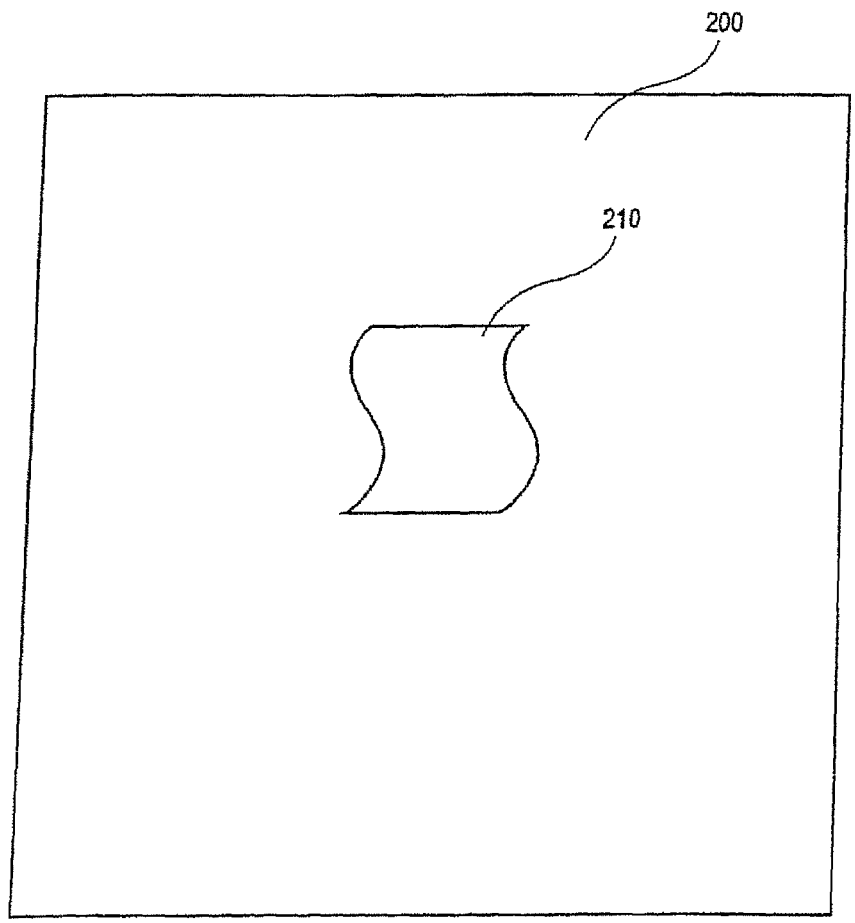
FIG. 2A illustrates an embodiment of a masking tool operating in accordance with the invention.

FIG. 2A illustrates a first embodiment of a masking tool as described in block 112 of FIG. 1A. Display 200 represents a sample screen while utilizing the software application 104 (FIG. 1A). A masking tool 210 is shown on the display 200, where masking tool 210 features one or more graphical representations. These graphical representations may be have a predetermined shape and size and/or may be set by the user to produce a customizable graphical representation. The predetermined forms of masking tool 210 may be preloaded into the digital camera during manufacturer or downloaded from a source over a network connection. The customized graphical representations of masking tool 210 may be stored within digital camera upon completion by the user, and may be transmitted to the server 101 for storage.

For instance, as shown in FIG. 2A, the embodiment of masking tool 210 is translucent and is defined by the clear outline. The masking tool 210 allows a selective application effects from the effects block 110 (FIG. 1A) by moving the masking tool 210 with respect to a static image as shown on the display 200. The portion of the static image as shown on the display 200 which is within the masking tool 210 is not modified by the application of the effects. This static image may be still image or an image from a video stream.

Furthermore, the masking tool 210 is capable of being dynamically moved with respect to the static image during the application of the effects. This allows the user to selectively apply the effect by interactively moving the mask tool simultaneously while applying the effect.

Another embodiment includes a masking tool that is able to interact directly with a localized image editing operation. For example, the masking tool may become entirely transparent in the immediate area where a user is currently applying an image effect. This allows the user to see the entire area that is mask without a mask or line obstructing the immediate work area.

Figure 2B:
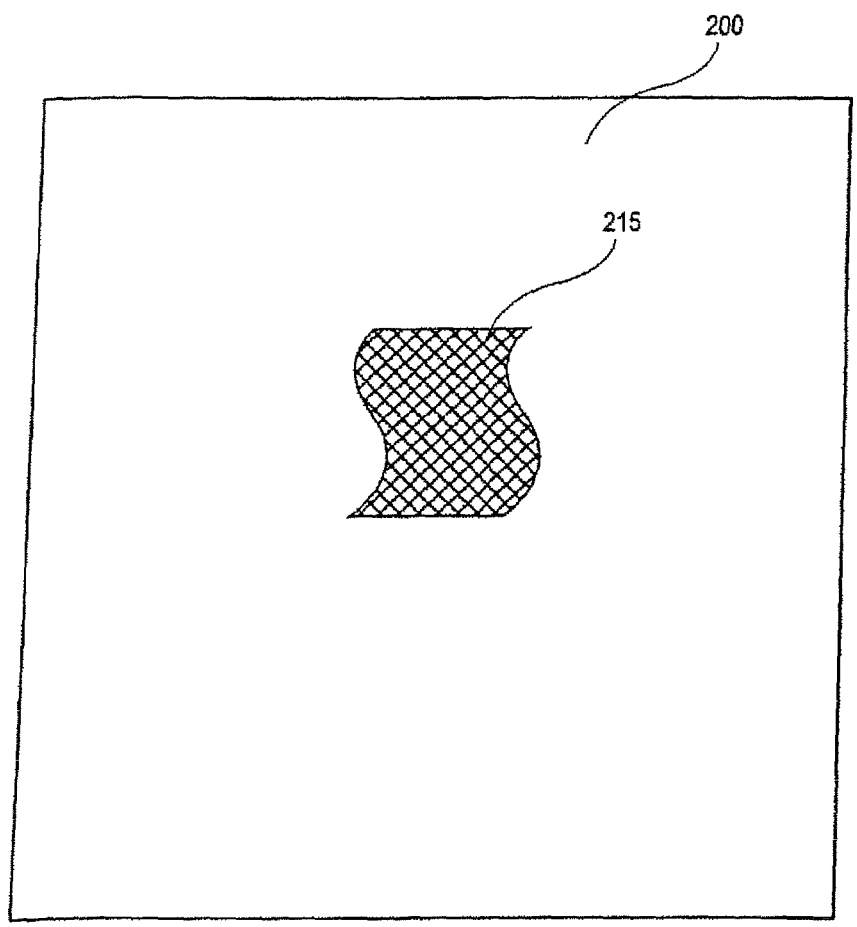
FIG. 2B illustrates another embodiment of a masking tool operating in accordance with the invention.

FIG. 2B illustrates a second embodiment of masking tool 215 represented on display 200. Masking tool 215 shows the portion within masking tool 215 to have a cross-hatched shading. Any type of shading can be utilized to illustrate the portion within the masking tool.

Figure 2C:
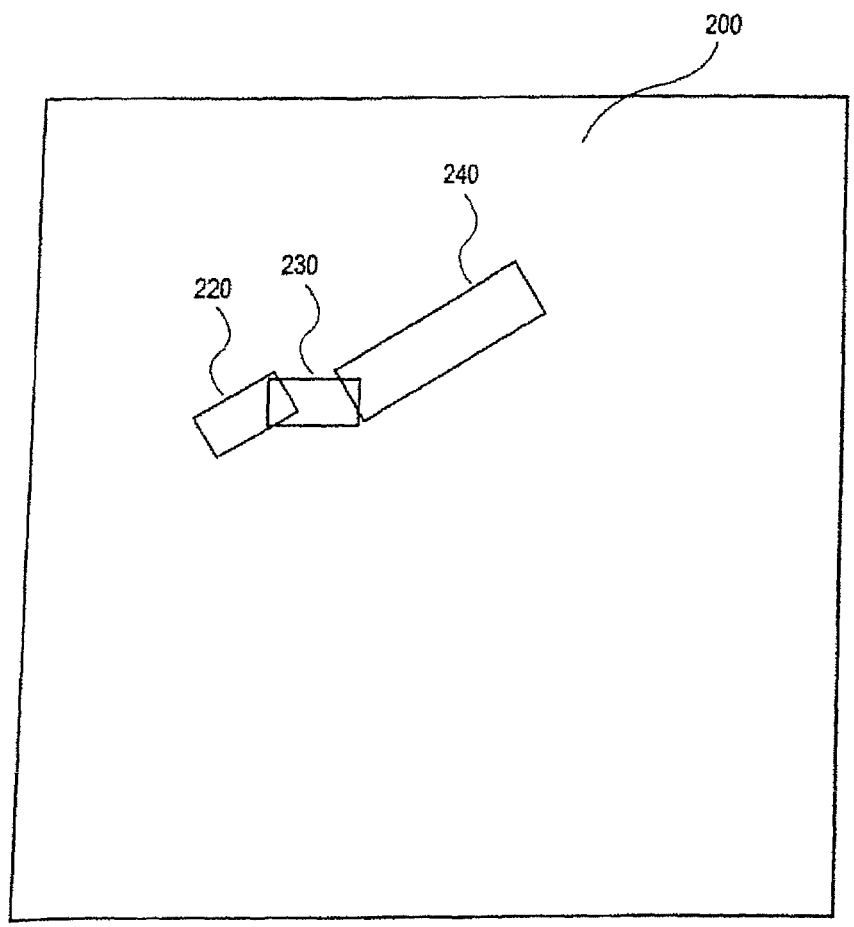
FIG. 2C illustrates another embodiment of a masking tool operating in accordance with the invention.

FIG. 2C illustrates a third embodiment of the masking tool represented on display 200. According to this embodiment, the shape of the masking tool can be easily created and modified. For example, within the display 200 there are a first masking tool 220, a second masking tool 230 and a third masking tool 240. Each of the first, second and third masking tools (220, 230, and 240) have differing sizes and may function independently or may be combined to form a single masking tool. Naturally, this specific example utilizes three portions to form independent or combined masking tools and any number of portions may be utilized to accomplish the same.

Like masking tools that take different sizes, masking tools may also take any multitude of shapes. The masking tools may simulate the use of a fixed edge such as a French Curve. The shape of the mask tool is infinitely changeable. Furthermore, the user may mask as much area of the image as desired and perform a global image effect on the entire image while protecting portions of the image from the image effects with the masking tools.

Figure 3:
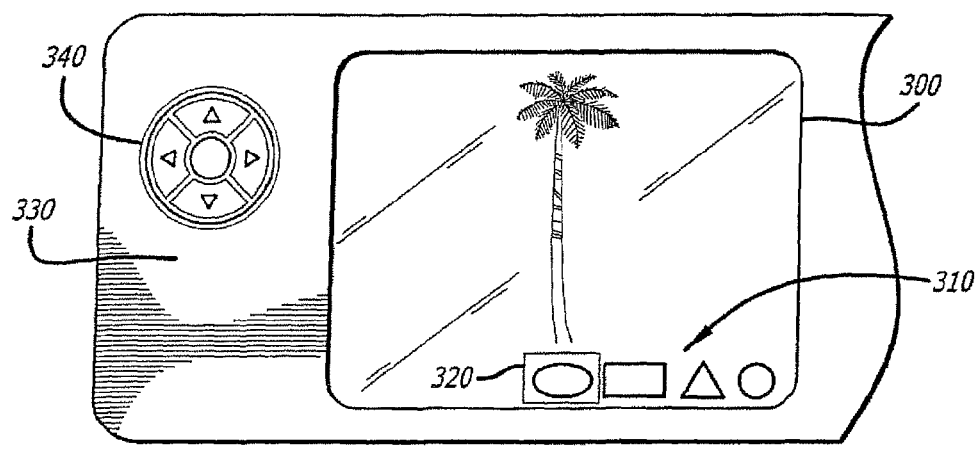
FIG. 3 illustrates an exemplary embodiment of a selection process for the masking tool of FIGS. 2A-2C.

FIG. 3 illustrates an exemplary embodiment of a screen display 300 featuring icons 310 representing various shapes for the masking tool. According to this embodiment, upon execution, a masking tool 320 is selected from icons 310 corresponding to a plurality of masking tool with graphical representations, namely different fixed shapes and sizes. Such selection may be accomplished by cycling through a series of masking tool icons 310 displayed on screen display 320 of a digital camera 330 using at least one control button 340 of digital camera 330. Alternatively, although not shown, such selection may be accomplished through a menu displayed on screen display 300 of digital camera 330, where the menu illustrates images or lists textual descriptions of the plurality of masking tool types. The selection of the menu entry is also controlled by control button(s) 340.

Figure 4:
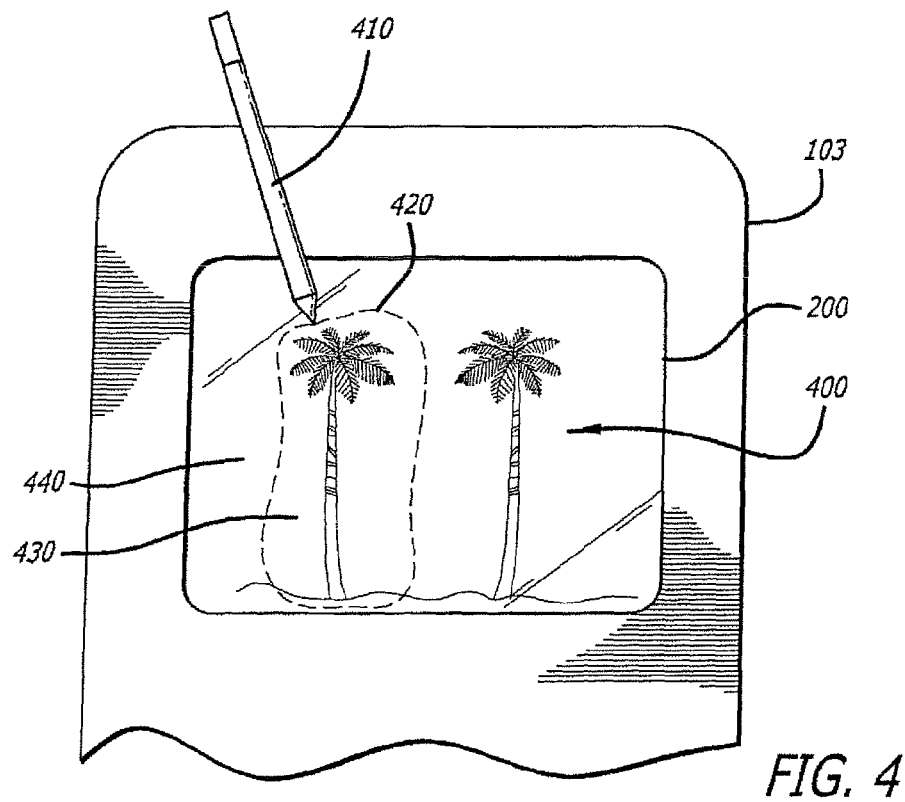
FIG. 4 illustrates an exemplary embodiment of a customization process for the masking tool of FIGS. 2A-2C.

FIG. 4 illustrates an exemplary embodiment of customization of the masking tool is shown. Display 200 of client 103 features an image 400. Using a stylus 410, for example, a pattern 420 is traced over image 400 illustrated by display 200. Upon completion of an enclosed pattern, a determination is made whether the area within the enclosed pattern 420 is selected to be the masking tool, illustrated in a transparent form, or whether the area outside the enclosed pattern 420 constitutes the masking tool. For instance, upon touching stylus 410 within a first area 430, namely the area within enclosed pattern 420 is considered to be the masking tool. As a result, when applied, an effect will be applied to the portion of image 400 outside first area 430 while no effect is applied inside first area 430 outlined by the masking tool. The transparent nature of the masking tool allows the user to see the lack of effects applied to the masked area. However, upon touching the stylus within a second area 440, namely the area outside enclosed pattern 420, any effect will be applied to the portion of image 400 inside first area 430 because the masking tool now covers second area 440.

C. Operations of the Masking Tool

Figure 5:
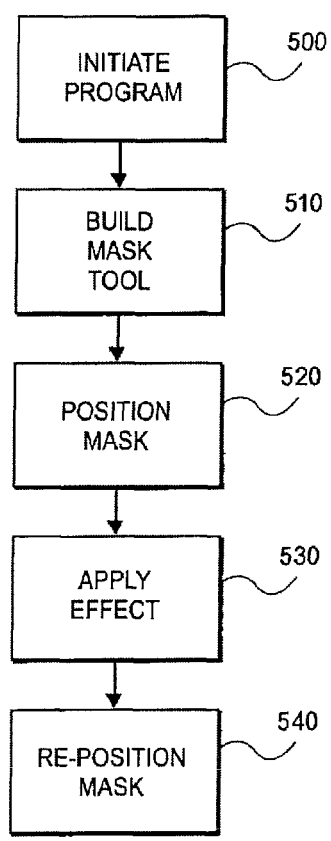
FIG. 5 illustrates a flow diagram of one embodiment.

FIG. 5 illustrates a flow diagram. At block 500, the application software 104 (FIG. 1A) is initiated. The user may build, create, and/or modify the shape and size of the masking tool in Block 510. The user may position the masking tool relative to the static image (Block 510). The user may position the masking tool relative to the static image (Block 520). The user may apply the image effect selectively to the image that is not masked by the masking tool (Block 530). The user may dynamically reposition the masking tool while simultaneously applying the image effect (Block 540).

Although specific embodiments have been illustrated and described herein, will be appreciated by those of ordinary skill in the art that any arrangement which is calculated to achieve the same purpose may be substituted for specific embodiments shown. This application is intended to cover any of the adaptations of variations of the present invention.

The terminology used in this application with respect to network architecture is meant to include all client/server environments. Therefore it is manifestly intended that this invention be limited only by the following claims and equivalents thereof.

What is claimed is:

1. A device for applying effects on an image, comprising:
a display; and
a masking tool comprising a plurality of graphical representations, wherein a portion of the image is altered when an effect is applied to the image, wherein the effect applied to the image utilizing an image resolution on the display uses a display resolution, further wherein the effect applied to the displayed image using the display resolution is correspondingly performed on the cloud server on the image using the image resolution.

2. The device according to claim 1 further comprising a second connection to at least one additional device, wherein the altered image is copied from a cloud server to the at least one additional device.

3. The device according to claim 1, wherein the image resolution is a higher resolution than the display resolution.

4. The device according to claim 1, wherein the masking tool comprises a plurality of masking tools.

5. The device according to claim 1, wherein the effect is generated by manually defining at least a portion of the image.

6. The device according to claim 5 wherein the effect is applied inside the manually defined portion of the image.

7. The device according to claim 5 wherein the effect is applied outside the manually defined portion of the image.

8. The device according to claim 1 wherein the effect further adjusts a size and/or shape of the portion of the image.

9. A method of masking programmed in a non-transitory memory of a device comprising:
positioning the masking tool and establishing a masked portion of an image;
altering a portion of the image when an effect is applied to the image, wherein when the effect is applied to the image, a corresponding effect is applied to the image stored on a cloud server in communication with the device.

10. The method according to claim 9 wherein the masking tool is translucent.

11. The method according to claim 9 wherein the positioning of the masking tool includes positioning the masking tool over the masked portion of the image displayed on the device.

* * * * *